United States Patent [19]
Vogel et al.

[11] Patent Number: 5,856,979
[45] Date of Patent: Jan. 5, 1999

[54] ERROR-ROBUST MULTIPLEX PROCESS WITH RETRANSMISSION

[75] Inventors: Peter Vogel; Gunnar Nitsche, both of Hildesheim, Germany

[73] Assignee: Robert Bosch GmbH, Stuttgart, Germany

[21] Appl. No.: 821,863

[22] Filed: Mar. 21, 1997

[30] Foreign Application Priority Data

Apr. 15, 1996 [DE] Germany .................. 196 14 737.9

[51] Int. Cl.$^6$ ...................................................... H04J 3/06
[52] U.S. Cl. ............................ 370/503; 375/364; 371/46
[58] Field of Search ................................. 370/470, 471,
370/473, 241, 350, 503–512, 387; 371/41,
46, 47.1, 48; 375/364

[56] References Cited

U.S. PATENT DOCUMENTS

| | | | |
|---|---|---|---|
| 5,307,351 | 4/1994 | Webster | 370/470 |
| 5,375,119 | 12/1994 | Koviu | 370/470 |
| 5,461,618 | 10/1995 | Chen et al. | 370/470 |
| 5,592,468 | 1/1997 | Sato | 370/471 |
| 5,598,581 | 1/1997 | Daines et al. | 370/471 |

*Primary Examiner*—Jason Chan
*Assistant Examiner*—Chiho Andrew Lee
*Attorney, Agent, or Firm*—Michael J. Striker

[57] ABSTRACT

In the process for data transmission via data blocks between a transmitting station and receiving station the data blocks each have a synchronization pattern field (SYNC), a header field (HEADER) and an information field (INFORMATION) following the header field. The process includes providing a fixed information field (FIXINFO) in each data block for information to be immediately transmitted without delays for error detection and correction following the synchronization pattern field (SYNC); immediately transmitting each fixed information field (FIXINFO) to the receiving station without information from the header field and independently of any occurring transmission errors after a receiver-side synchronization and testing a remaining portion of each data block for at least one error within a predetermined error detection range in the receiving station and, when the at least one error is detected within the detection range, performing an error correction only for that remaining portion of the data block.

13 Claims, 2 Drawing Sheets

ERROR-ROBUST MULTIPLEX PROCESS WITH RETRANSMISSION

Background of the Invention

The present invention relates to a process for transmission of data blocks each having a synchronization field SYNC signaling the beginning of the data block, an INFORMATION field and a HEADER field including control characters for the treatment of the following INFORMATION field.

A process for transmission of data blocks, protocol H.22P (ITU-T Study Group 15, LBC 95-276, "ITU-T Recommendation H.22P") is already known in the art.

In this protocol the structure, the formats of the data and the control field and structure for the data to be transmitted by the multiplexer, establish the multiplex process protocol. The multiplex protocol facilitates the processing of logical information, which arrives in the multiplex level via the adaptation level, into uniform data units. The protocol allows the transmission of arbitrary combinations of digital, audio and video data or other information under data control and provides a special protocol for prevention of data loss, which has a synchronization pattern of 31 bits in length. The HEADER field (31 to 63 bits) and the INFORMATION field of fixed length are placed after it. The synchronization pattern must be detected by a correlation condition in a receiver so that the processing of the data blocks in the receiver can begin.

In this process data loss can occur by loss of synchronization. Also a repeated attempt to transmit erroneous data is not provided. Furthermore no mechanism is introduced which fills the data blocks of fixed length with data when the data source no longer supplies data.

SUMMARY OF THE INVENTION

It is an object of the present invention to provide an improved error-robust multiplex process with possible retransmission of the above-described type, which reduces or eliminates the above-described disadvantages.

This object, and others which will be made more apparent hereinafter, are attained in a process for data transmission by means of data blocks between two stations each having a synchronization pattern field, a header field and an information field, in which the synchronization pattern field indicates a beginning of one data block and the header field contains control characters for processing the information field following the header field.

The process according to the invention comprises the steps of providing a fixed information field and a retransmission-control field in addition to the synchronization pattern field, the header field and the information field in each data block; after a receiver-side synchronization immediately transmitting the fixed information field to the receiving station without information from the header field and independently of any error transmission occurring; and testing a remaining portion of each data block for at least one error within a predetermined error detection range in the receiving station and, when the at least one error is detected within the detection range, performing an error correction only for that remaining portion of the data block.

The process according to the invention has the advantage that the erroneous or error-containing data are corrected by a fresh transmission and the multiplex protocol with the fixed information and the retransmission-control field allows a flexible retransmission of portions of the data blocks in which certain data are continuously freshly transmitted and are selected for retransmission. The loss of data by erroneous demultiplexing is substantially reduced since the possibility arises to input an erroneous header field again.

A further advantageous improvement of the above-described process according to the invention is set forth in the appended dependent claims.

In one embodiment of the invention the length of the fixed information field is easily adjusted as required to the different data sources, advantageously with an appropriate control protocol.

In an additional embodiment in which data areas for predetermined data sources are set up in the fixed information field by a control protocol, the data transmitted in the fixed information field are especially reliably transmitted without delay by their fixed relationships.

The fixed information field contains information from data sources which should be transmitted without delay, the transmission should occur continuously.

In preferred embodiments further processing the fixed information field continues even when errors occur following it.

According to an advantageous feature of the invention are detected at the receiver end for possible retransmission only in the header field, information field and the retransmission-control field. There is no error detection in the fixed information field.

In a preferred embodiment if the data source does not include sufficient data, the fixed information field is filled with filling bits in the absence of corresponding bits transmitted from the respective data sources.

In several advantageous preferred embodiments the retransmission-control field is provided with a transmission number and information regarding a reception number designating a last or previously received packet and an error state thereof. This provides a simple signaling of errors in data transmission in the retransmission-control field with the help of detection of the error state and the reception number of the associated data block.

In another embodiment the retransmission-control field contains at least one error signaling bit which, when set, indicates retransmission of data designated by the reception number in the retransmission-control field (RET). This increases the reliability of the data transmission.

The retransmission can advantageously occur completely after detecting errors and the setting of an error transmission bit. However in many cases it is better only to retransmit the nonredundant portions of the data block.

To improve the entire data transmission process error detection and error correction processes can be used in the retransmission-control field, the header field, the fixed information field and the information field.

The embodiment in which the retransmission-control fields and the header fields are distributed (interleaved) throughout the respective data blocks is particularly preferred.

BRIEF DESCRIPTION OF THE DRAWINGS

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
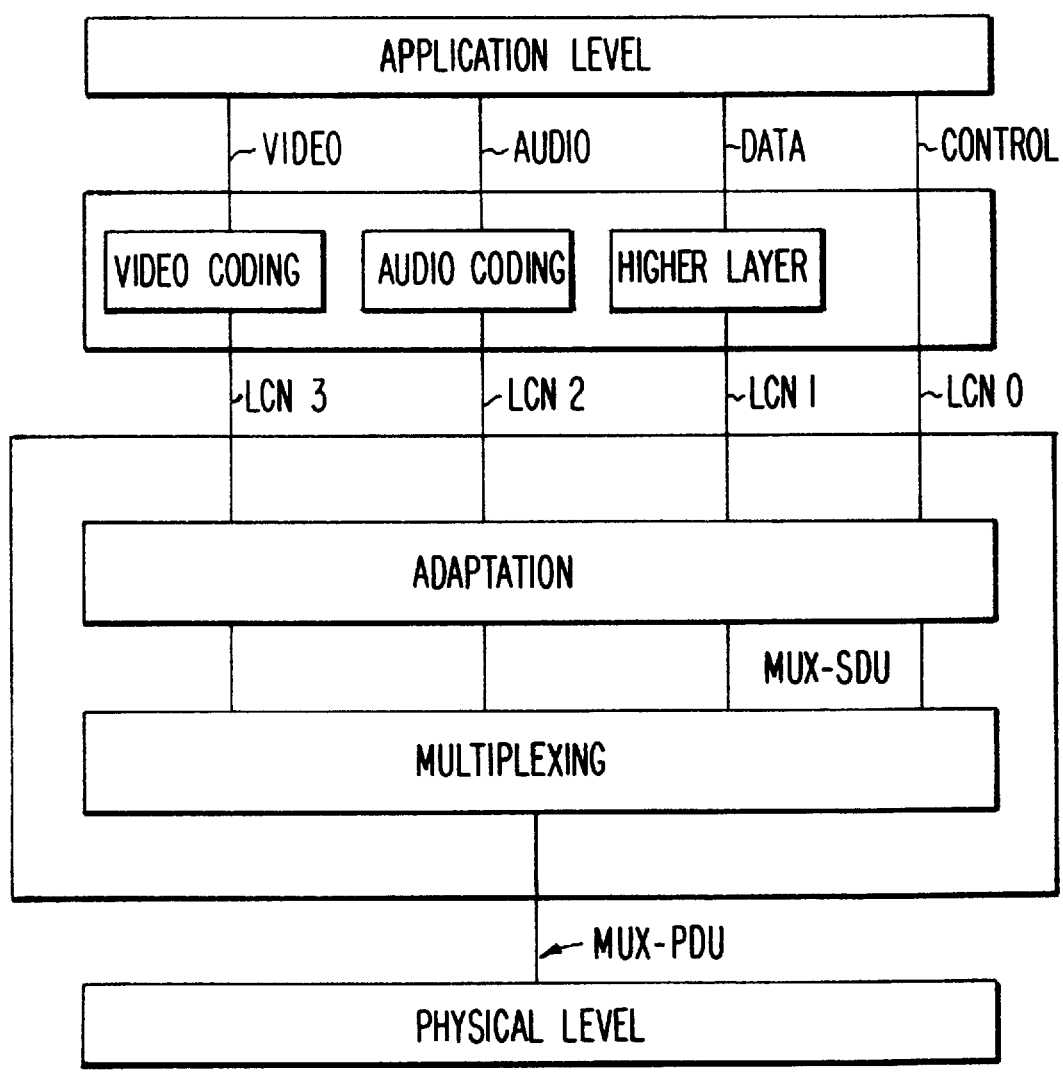
FIG. 1 is a diagram of the structure of the process of multiplex data transmission.

The data transmission of arbitrary data signals occurs via the hierarchically organized levels according to FIG. 1. The analog signals in part come from the individual data units to the coding level via the application level. After a digitalization step the contents of the logical channels LCN are further sent to the adaptation level of the multiplexer. The data reaches the multiplex level as MUX-SDU (Service Data Units) still in the separate channels. These levels combine the plurality of channels from the different data sources into a single channel and provide MUX-PDUs (Protocol Data Units). These data packets are filled with signals from the different sources according to the protocol of the invention.

Figure 2:
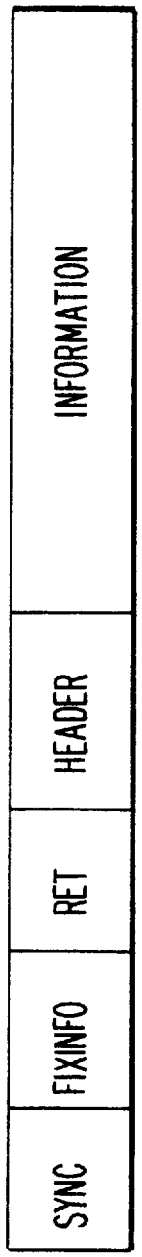
FIG. 2 is a diagram showing the structure of the data unit of the multiplex protocol.

FIG. 2 shows the sequence of the control and data fields in one such MUX-PDU. The first field SYNC contains a synchronization word or pattern of variable length, which contains a bit sequence to be detected, e.g. of 31 bits. The synchronization pattern is placed at the beginning of each data block in the synchronization pattern field, SYNC. For example, a Barker sequence or Williard sequence can be used as the synchronization pattern.

The fixed information field, FIXINFO, follows as an additional Field. FIXINFO designates an optional adjustable data block, which must not be defined or specified by the following HEADER field. For each data source an arbitrarily larger area of this data field can be reserved. This data field must subsequently be input into each data block and must be transferred. The data field particularly is considered as a source of data, which are to be transferred into most (or all) data blocks. The FIXINFO field is ideal for data sources for which a delay, e.g. by retransmission or other waiting time, should be avoided. Thus it is acceptable through out with audio signals that individual data contain errors, if the data flow only remains delay-free or contains a constant delay(interleaving).

The retransmission-control field, RET, is a control field, which, e.g., contains the necessary data in order to cause a repeat or new transmission of error-containing data.

In the header field, HEADER, a transmission scheme for the information block following the RET field is provided. One example of one such transmission scheme is described in the Protocol H.233 (ITU-T Study Group 15). One such HEADER field has, e.g., 4 bits. All 16 states which the HEADER can be described with the 4 bits are tabulated in a table. If one, for example, only transmits audio signals, a certain bit sequence is set up, the information block for audio signals and video signals is divided and another bit sequence is sent.

The information field, INFORMATION, follows the other fields. It is structured according to the control devices set up in the HEADER field for the different data sources. The information field is filled with data according to the multiplex scheme provided in the HEADER field until the packet length n is reached.

A connection must be made as the first step for a data transmission. Moreover the length n of the data block is set up with the help of a control protocol. The length n is set up for the receiver and transmitter, also at a later point in time. Furthermore the control protocol must act during the transmission and make a comparison. The data field FIXINFO is either specified prior to making the connection between the transmitter and receiver or it is set up by means of a special control protocol between the transmitter and receiver. In the second case it is possible also during the connection to make changes in the data block. That is significant, e.g., when a data source does not have more data to send and the corresponding data region is no longer required.

Since the structural length n of the data blocks can be maintained constant by a time interval established in the control protocol, the following synchronization strategy may be used: to begin the transmission the receiver seeks the synchronization pattern. The synchronization pattern must only select at the suitable positions along the length n and must be tested. It is of advantage to use a shorter length for n at the beginning of the transmission (connection made with the help of a control protocol) during making the connection and at the synchronization start. A time point is established at which the length n is changed with the help of the control protocol.

For detection of the SYNC on the receiver end of the data transmission in the demultiplexer a minimum number of bits is defined, which must agree between a pattern in the data flow and the synchronization pattern set up by the control protocol. If this minimum correlation condition is attained (correlation condition), the synchronization pattern has been found. In case a synchronization pattern has been found, an error detection process takes place for the HEADER. A successful structuring of the synchronization only occurs in the receiver, when an error-free HEADER was found at the synchronization pattern. An error detection can be a parity check in the simplest case, however it is advantageously performed with a CRC code. If an error is discovered during transmission of the data, the synchronization process is continued with the search for the next synchronization pattern. In this example the SYNC and the associated error-free HEADER must be found once in order to bring about the start-synchronization.

When the start-synchronization process is performed successfully, the next synchronization pattern is sought at times after a complete loop of length n. At the same time a counter is incremented, when the synchronization pattern does not fulfill the correlation condition and the HEADER cannot be detected error-free. When the counter has exceeded a certain limiting value G2 (a whole number value, which is established by the control protocol), the synchronization must be considered as lost and according to the above-described scheme must be synchronized. Typically the synchronization is considered lost after four attempts and a new start-synchronization follows.

When the start-synchronization occurs in the receiver, the processing of the FIXINFO field and RET field, the HEADER field and the INFORMATION field begins. The data field FIXINFO is conducted immediately into the appropriate data source without knowledge of the HEADER and independently of the eventual transmission errors and error correction strategy. An error-free HEADER is not necessary for demultiplexing of this data field. In the remaining data block portion, which comprises RET, HEADER and INFORMATION fields, areas are set up, in which a search for errors in the reception takes place (detected areas). If the detected areas are determined to contain errors, it is possible to perform arbitrary error-correction steps for the remaining packet, e.g. a retransmission. The information required for the retransmission are contained in the RET field.

As an example the following syntax can be used for the RET field: Two stations are considered, which can each be both transmitter and receiver. Each packet is associated with a transmission number. Additionally the transmission number of the last received packet is transmitted (reception number). An additional bit in RET field indicates whether the last received packet contained errors or was error-free. This reception number and the error bit are transmitted from the receiver of one station to the transmitter of the other station. According to choice other bits (repeat code) are used for the error signal. If no error is signaled, the data transmission is without problem. If an error bit is detected in the RET field, the packet with the associated reception number is transmitted anew. The error bit is set when the receiver of one station finds an error in the HEADER field, in the INFORMATION field or in a portion of the RET field, namely the transmission number.

An additional embodiment is described in the following paragraphs.

If a data source is not placed in the state in which the associated data area in FIXINFO is completely filled with data, thus it must be filled with appropriate data, namely the filling bits. The INFORMATION field may be filled with filling bits according to the same methods.

On retransmission according the above-described example the data block, comprising RET, HEADER and INFORMATION field is freshly or newly transmitted in the case of an error (ARQ, Type I). An additional possible embodiment of the process occurs in application which only requires new redundancies (ARQ, Type II).

Besides the already-described transmission methods it is also possible to use FEC methods (Forward Error Correction) as additional error protection for the FIXINFO, RET, HEADER and INFORMATION fields.

Also the RET and HEADER fields can be distributed throughout the data blocks in other embodiments (Interleaving).

The disclosure of German Patent Application 1 96 14 737.9 of Apr. 15, 1996 is incorporated here by reference. This German Patent Application describes the same invention as described hereinabove and claimed in the claims appended hereinbelow and forms the basis for a claim of priority under 35 U.S.C. 119.

While the invention has been illustrated and described as embodied in an error-robust multiplex process with retransmission, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A process for transmission of data from data sources by means of data blocks between a transmitting station and a receiving station, said data blocks each having a synchronization pattern field (SYNC), a header field (HEADER) and an information field (INFORMATION), wherein said synchronization pattern field (SYNC) of each of said data blocks indicates a data block beginning, the information field follows the header field and the header field contains control characters for processing the information field (INFORMATION), said process comprising the steps of:

a) providing a fixed information field (FIXINFO) in each of said data blocks for data for which a delay in transmission due to error correction processes is avoided;

b) immediately transmitting said fixed information field (FIXINFO) of each of said data blocks to the receiving station without information from the header field and independently of any occurring erroneous transmissions after a receiver-side synchronization for said data block; and c) testing a remainder of each data block for at least one error within a predetermined error detection range in the receiving station and, when said at least one error is detected within said detection range, performing an error correction only for said remainder of the data block, wherein said remainder of each of said data block does not include the fixed information field (FIXINFO).

2. The process as defined in claim 1, further comprising providing a retransmission-control field (RET) in each data block, said retransmission-control field (RET) containing means for controlling a retransmission of parts of said data block in which said retransmission-control field (RET) is located, and said error correction comprises retransmission of said parts of said data block.

3. The process as defined in claim 1, wherein the fixed information field (FIXINFO) has an adjustable length and further comprising providing a control protocol comprising means for controlling said adjustable length of the fixed information field (FIXINFO).

4. The process as defined in claim 3, further comprising setting up data areas for data from predetermined data sources in the fixed information field (FIXINFO) with said control protocol.

5. The process as defined in claim 4, further comprising further processing the fixed information field (FIXINFO), even when the at least one error is detected during the testing following the fixed information field.

6. The process as defined in claim 2, further comprising performing the testing for the at least one error for possible retransmission during reception only in the header field (HEADER), the information field (INFORMATION) and the retransmission-control field (RET).

7. The process as defined in claim 4, further comprising filling the fixed information field (FIXINFO) with filling bits when corresponding bits transmitted into said data areas for the data from the predetermined data sources are absent because said corresponding bits were no longer transmitted from the predetermined data sources.

8. The process as defined in claim 2, further comprising providing a transmission number and information regarding a reception number designating a last or previously received packet received in the receiving station and an error state thereof in the retransmission-control field (RET).

9. The process as defined in claim 8, further comprising providing at least one error signaling bit in the retransmission-control field (RET), and wherein said at least one error signaling bit, when set, indicates retransmission of data elements designated by said reception number set in the retransmission-control field (RET).

10. The process as defined in claim 9, further comprising completely retransmitting after detecting said at least one error and setting said at least one error signaling bit.

11. The process as defined in claim 9, further comprising retransmitting only nonredundant portions of the remainder of each of the data blocks after detecting said at least one error therein and setting said at least one error signaling bit.

12. The process as defined in claim 2, further comprising distributing the retransmission-control field (RET) and the header field (HEADER) throughout the one of the data blocks containing said retransmission-control field (RET) and said header field (HEADER).

13. The process as defined in claim 1, further comprising interleaving the retransmission-control field (RET) and the header field (HEADER) throughout the one of the data blocks containing said retransmission-control field (RET) and said header field (HEADER).

* * * * *